US006061747A

United States Patent [19]

Ducaroir et al.

[11] Patent Number: 6,061,747

[45] Date of Patent: May 9, 2000

[54] SYSTEM FOR SENDING DATA FROM-AND-TO A COMPUTER MONITOR USING A HIGH SPEED SERIAL LINE

[75] Inventors: Francois Ducaroir, Santa Clara; Karl S. Nakamura, Palo Alto; Michael O. Jenkins, San Jose, all of Calif.

[73] Assignee: LSI Logic Corporation, Milpitas, Calif.

[21] Appl. No.: 08/951,530

[22] Filed: Oct. 16, 1997

[51] Int. Cl.[7] .............................. G06F 3/14; G06F 13/00

[52] U.S. Cl. ................................ 710/21; 710/61; 710/62; 710/129; 345/526

[58] Field of Search .................................. 710/1, 61, 62, 710/129, 7, 20, 21; 345/526, 204, 520, 1–3

[56] References Cited

U.S. PATENT DOCUMENTS

| | | | |
|---|---|---|---|
| 4,949,169 | 8/1990 | Lumelsky et al. . | |
| 5,020,135 | 5/1991 | Kasparian et al. | 455/76 |
| 5,079,770 | 1/1992 | Scott | 370/536 |
| 5,182,642 | 1/1993 | Gersdorff et al. | 348/388 |
| 5,410,547 | 4/1995 | Drain . | |
| 5,557,663 | 9/1996 | Huang et al. . | |
| 5,577,208 | 11/1996 | Couturier | 709/210 |
| 5,594,660 | 1/1997 | Sung et al. . | |
| 5,594,921 | 1/1997 | Pettus | 710/11 |
| 5,642,139 | 6/1997 | Eglit et al. . | |
| 5,642,497 | 6/1997 | Crary et al. | 395/500 |
| 5,664,218 | 9/1997 | Kim et al. | 710/1 |
| 5,666,491 | 9/1997 | Harris et al. | 395/802 |
| 5,751,222 | 5/1998 | Trainor et al. | 340/825.05 |
| 5,796,440 | 8/1998 | Rupinski et al. | 348/476 |
| 5,802,281 | 9/1998 | Clapp et al. | 710/11 |
| 5,872,784 | 2/1999 | Rostoker et al. | 370/395 |
| 5,890,061 | 3/1999 | Timm et al. | 455/404 |

OTHER PUBLICATIONS

LSI Logic CoreWare System–on–a–Chip Design Program, LSI Logic Corporation, Jul. 1996, pp. 1–20.

*Primary Examiner*—Xuan M. Thai
*Attorney, Agent, or Firm*—Conley Rose & Tayon; Kevin L. Daffer

[57] ABSTRACT

An improved transceiver pair that are tightly integrated into a computer system. The transceiver pair include a base transceiver and a remote transceiver, with a high speed serial connection between them. The base transceiver has a base transmitter with a parallel input port for accepting parallel, encoded data and a serial output port for transmitting a serial, encoded data stream. The remote transceiver has a receiver with a serial input port for receiving the serial, encoded data stream and an audio/video output port for passing deserialized data to an audio and video control unit after decoding. The high speed serial connection links the base serial output port to the remote serial input port. The remote receiver further includes a feedback input port adapted for receiving feedback data forwarded from a sensor. The sensor may respond to palpable, optical or sonic input or to physical contact. The computer system may include the remote transceiver for transmitting a return serial data stream, a transmitter operably coupled between the feedback input port and the remote serial output port, and a timing generator coupled to recover a clock signal from the serial data stream and to synchronize the deserialized data. The base transceiver may also include a serial input port for receiving the return serial data stream, a receiver operably coupled to the serial input port, and a return high speed serial connection between the remote serial output port and the base serial input port. The return serial data stream is received concurrent with the serial data stream being received.

18 Claims, 4 Drawing Sheets

SYSTEM FOR SENDING DATA FROM-AND-TO A COMPUTER MONITOR USING A HIGH SPEED SERIAL LINE

BACKGROUND OF THE INVENTION

1. Field of the Invention

This invention relates to computer systems in general and, more particularly, to a pair of transceivers for receiving and deserializing serialized data at a computer monitor while transmitting serialized feedback control data obtained from a sensor back to the main computer which may be some distance away from the computer monitor.

2. Description of Related Art

The concept of sending video data to a computer monitor is generally well known. A typical video card is illustrated in FIG. 4 shown as an add-in card for an input/output (I/O) bus 340 with connector 400. Signals forwarded through connector 400 include control data (shown with open arrowheads) and data (shown with solid arrowheads). These signals may be forwarded from the I/O bus 340 into a graphics display processor 410 which manipulates the incoming video data for output to the monitor through a parallel output port 450 having parallel data lines.

Typically, 32 bit data and various control data are output from the graphics display processor 410 into video RAM (Random Access Memory) 420 such as EDO (Extended Data Out) RAM, VRAM (Video RAM) or SGRAM (Synchronous Graphics RAM), usually dual ported memory, in amounts of 1 MB (MegaByte), 2 MB, 4 MB or even 8 MB. As illustrated, 4 MB of video RAM 420 are assumed in four banks of memory as is well known in the art. Each bank outputs 32 bits of video data to a graphics interface 430 which also accepts control data from the graphics display processor 410 and outputs the video data to a RAMDAC (RAM Digital-to-Analog Convertor) 440 for conversion from digital data into the analog data required by most standard analog computer monitors. Video data may also be returned to the graphics interface 430 from the RAMDAC 440. The RAMDAC 440 outputs video data to the display of the standard monitor through the parallel output port 450. Command information for the video data from the graphics display processor 410 may also be included in the output parallel data stream to the standard monitor.

The use of a sound card to transmit audio data to a set of speakers is also well known, as is the idea that audio and video data may be combined and synchronized. Problems arise in keeping the audio and video in synch without using separate clocks that must be continually rechecked. If a single clock is used, distances between the audio card and video card may cause timing delays that must be accounted for. Is it also generally useful to have a user feedback device (e.g. mouse, keyboard, or touch screen) located on or near the display. It is typical for a separate cable to be used which connects between the computer unit itself and the feedback device.

A system is therefore needed which is inexpensive to build yet integrates audio, video and control data and its transmission from a base computer system to a monitor. A minimum number of data lines, pins and other connections are also needed. For ease of integration into legacy systems, this enhanced system should be manufacturable as a single chip solution, preferably in CMOS (Complementary metal Oxide Semiconductor) and not more expensive semiconductors such as GaAs (gallium arsenide) or BiCMOS (Bipolar CMOS). The ability to accept and transmit feedback data from the user at the monitor is also desirable. Even more desirable is the ability to keep the feedback data from the remote sensor in synch with the audio, video and control data that lead to the response of the user.

SUMMARY OF THE INVENTION

The problems outlined above are in large part solved by an improved transceiver pair that are tightly integrated into a computer system. Broadly speaking, the transceiver pair include a base transceiver and a remote transceiver, with a high speed serial connection between them. The base transceiver has a base transmitter with a parallel input port for accepting parallel data and a serial output port for transmitting a serial data stream. The remote transceiver has a receiver with a serial input port for receiving the serial data stream and an audio/video output port for passing deserialized data to an audio and video control unit. The high speed serial connection links the base serial output port to the remote serial input port. The remote receiver further includes a feedback input port adapted for receiving feedback data forwarded from a sensor to the audio and video control unit. The sensor may respond to palpable, optical or sonic input or to physical contact.

Additional features of the computer system may include the remote transceiver including a serial output port for transmitting a return serial data stream, a remote transmitter operably coupled between the feedback input port and the remote serial output port, and a timing generator coupled to recover a clock signal from the serial data stream and to synchronize the deserialized data from the recovered clock signal. The base transceiver may also include a base serial input port for receiving the return serial data stream, a base receiver operably coupled to the base serial input port, and a return high speed serial connection between the remote serial output port and the base serial input port. Preferably, the return serial data stream is received by the base serial input port concurrent with the serial data stream being received by the remote serial input port. The serial data stream comprises video, audio and control data. The base transceiver may further include a serializer coupled to convert the parallel data into the serial data stream, and the remote transceiver may further include a deserializer coupled to convert the serial data stream into the deserialized data.

A complete computer system including the transceiver pair also includes the following components. A CPU, main memory, and an audio/video interface are comprised in the base unit. The audio/video interface includes a graphics display processor, video RAM, and an improved graphics interface unit. The graphics display processor is coupled to accept commands from the CPU and data from the main memory, and is operable to process graphics and video data. The video RAM is coupled to accept and store processed graphics and video data output by the graphics display processor.

The improved graphics interface unit is coupled to accept processed graphics and video data stored by the video RAM, and is further coupled to accept input from the graphics display processor. Included in the improved graphics interface unit are a transmitter, a transmit buffer, a receive buffer, and a receiver. The transmitter receives outgoing video, audio and control data in their native formats and transmits the outgoing video, audio and control data. The transmitter includes a serializer coupled to the transmit buffer for converting the outgoing video, audio and control data into serialized video, audio and control data. The transmitter also includes an encoder that takes a data stream and ensures that transitions appear in the data stream so that the receiver can recover the transmitted clock. The transmitter additionally includes a transmit clock generator which uses its clock signal to time serialization and transmission of the encoded serialized data. The transmit buffer receives the serialized, encoded video, audio and control data before transmission. The receive buffer receives the serialized, encoded video, audio and control data after transmission. The receiver receives the serialized, encoded video, audio and control data from the receive buffer and includes a decoder for decoding the encoded data, as well as a deserializer for converting the serialized video, audio and control data into native format video, audio and control data. The receiver further includes recovery and alignment logic coupled to the deserializer for recovering the native format video, audio and control data and synchronizing the native format video, audio and control data with each other. Also included is a receive clock generator which uses the clock signal to recover a data clock from the serialized video, audio and control data. The improved graphics interface is preferably a monolithic integrated circuit, which is also preferably a CMOS integrated circuit A digital monitor is coupled to the computer system base by a high speed serial communications line as well as a return high speed serial communication line. The digital monitor includes a communications module with a timing generator, a transceiver, control registers and a sound generator. The timing generator generates a clock signal for synchronized timing in the communications module. The control registers store native format control data and the sound generator produces audio signals which correspond to the native format audio data for output to speakers. The transceiver transmits and receives encoded serialized video, audio and control data from the base unit as well as encoded returning feedback data from a sensor coupled to the monitor. The monitor also includes a display unit for displaying the native format video data.

BRIEF DESCRIPTION OF THE DRAWINGS

Other objects and advantages of the invention will become apparent upon reading the following detailed description and upon reference to the accompanying drawings in which.

DETAILED DESCRIPTION OF PREFERRED EMBODIMENTS

The use of a letter as part of a number designating a component of a system described in this document will be to show multiple instances of equivalent components. All figures will use a uniform numbering system with equivalent parts across the figures being given identical numbers.

Figure 1:
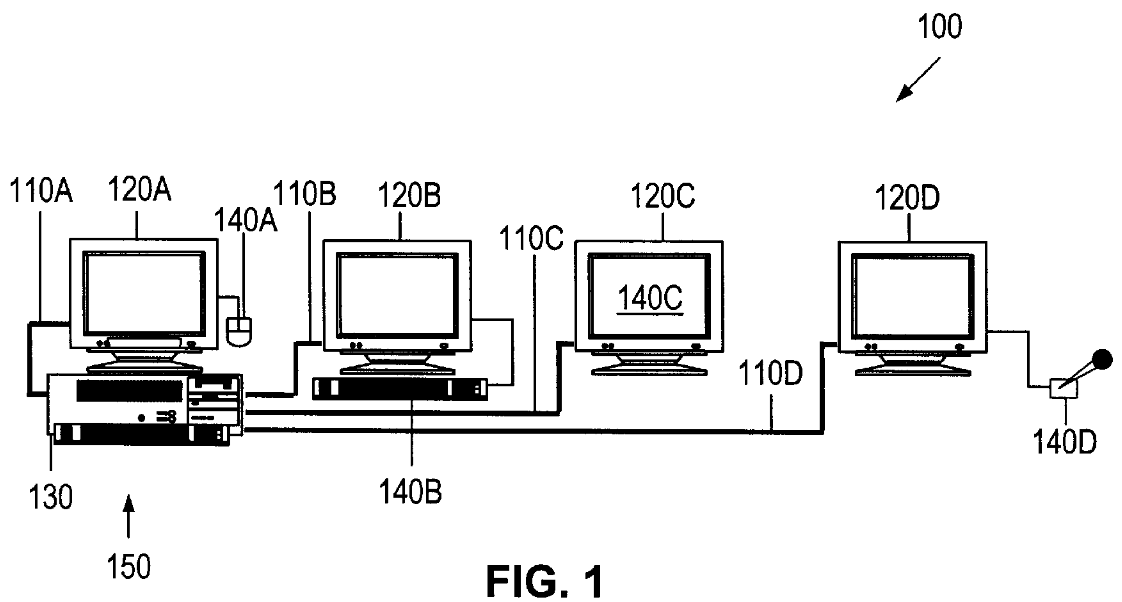
FIG. 1 is a computer network having a server computer and three remote terminals, each employing a high speed serial connection and feedback sensor through the monitor according to one embodiment of the present invention.

Turning now to the drawings, FIG. 1 shows a computer network 100 according to one embodiment of the present invention. Server computing system 150, which will be described in more detail below with respect to FIG. 2, includes a computer 130 having an enhanced video card 200 according to another embodiment of the present invention, an enhanced monitor 120A according to still another embodiment of the present invention, with the computer 130 and the monitor 120A connected by a high speed serial line 110A. Further details concerning the enhanced video card 200, enhanced monitor 120 and the high speed serial line 110 will be described hereafter with respect to other figures.

Connected to the server computing system 150 are three additional terminals, monitors 120B, 120C and 120D, connected to the server computer 130 by high speed serial lines 110B, 110C and 110D, respectively. Monitor 120B is shown with a feedback sensor 140B which may be keyboard. Other feedback sensors 140 which respond to palpable input may also be used. Another example of similar feedback sensors 140 are those which provide an output signal or control data in response to physical contact upon the sensor. Monitor 120C shown with a feedback sensor 140C, which is a touch sensitive screen, is another example of this type of sensor. Monitor 120D is shown with a feedback sensor 140D which is a microphone. Other sensors which provide control data output to sonic or sound wave input are also contemplated. Optical input, such as through a light pen, is also contemplated. Other forms of energy which may be converted to electrical, optical or other relevant forms of energy for input into a computer system through an input device or sensor may also be used.

Other numbers of monitors 120 with associated serial connections 110 and other components are also contemplated. Three such groups are shown only for the sake of simplicity. It is contemplated that the computer system 100 could be placed in a classroom or other instructional facility with the teacher facilitating server computing system 150 and the pupils at the monitors 120. Instructional material could be sent collectively to all monitors 120 or individualized material could be sent separately to each monitor 120. Pupils would provide feedback appropriate to their learning experience via their respective sensor 140 to the teacher.

The digital monitor 120 shown in various embodiments in FIG. 1 also preferably includes, or is connected to, speakers (not shown) for providing sound output for a complete multimedia experience with video and audio data synchronized together and with data provided through the sensors 140. Data transmitted from the server computing system 150 to monitor 120A or to any one of the other monitors 120B–120D and carried through communication lines 110A–110D are converted to native format video, audio and control data by an advanced transceiver, also called a communications module, which will have various embodiments described in detail with respect to FIGS. 5–7 hereafter.

Figure 2:
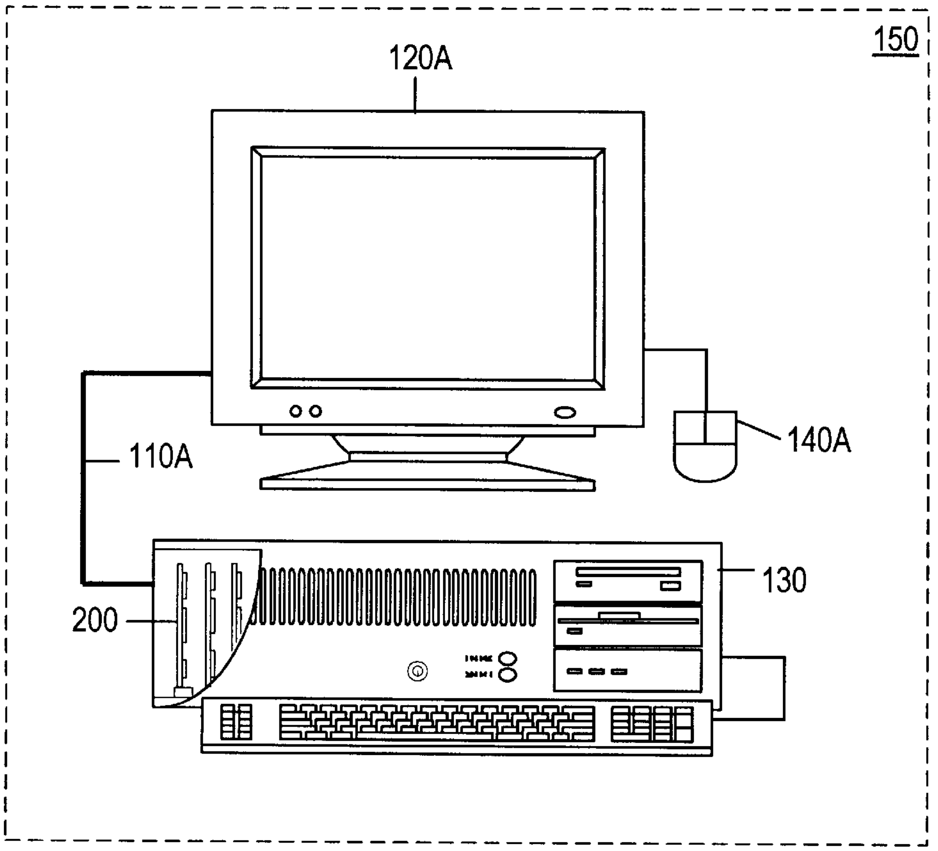
FIG. 2 is close-up and cut-away view of the server computer of FIG. 1 showing the enhanced video card according to one embodiment of the present invention.

A more detailed look in FIG. 2 at server computing system 150 is shown without the additional data connections 110B–110D, monitors 120B–120D and related sensors 140B–140D of the computer network 100 given in FIG. 1. A standard keyboard is shown with computer 130. An enhanced video card 200 is shown through a cut-away as being present in computer 130. The enhanced video card 200 is coupled in the rear (not shown) to the high speed serial line 110A which transmits audio, video, control and feedback data to and from the computer 130 and the monitor 120A. Attached to monitor 120A is a light pen 140A as an embodiment of sensor 140. Speakers (not shown) accept output audio data from the enhanced video card 200.

Enhanced video card 200 and monitor 120A each include an advanced transceiver. A base transceiver is present within enhanced video card 200, and a remote transceiver is present in monitor 120A. High speed serial connection 110A between the base transceiver and the remote transceiver provides the serial data transfer of audio, video and control data from the enhanced video card 200 to the monitor 120A and feedback data or control data from the sensor 140A to the computer 130. Additional details concerning the enhanced video card 200 and the transceivers will be given below with respect to FIGS. 5–7.

Figure 3:
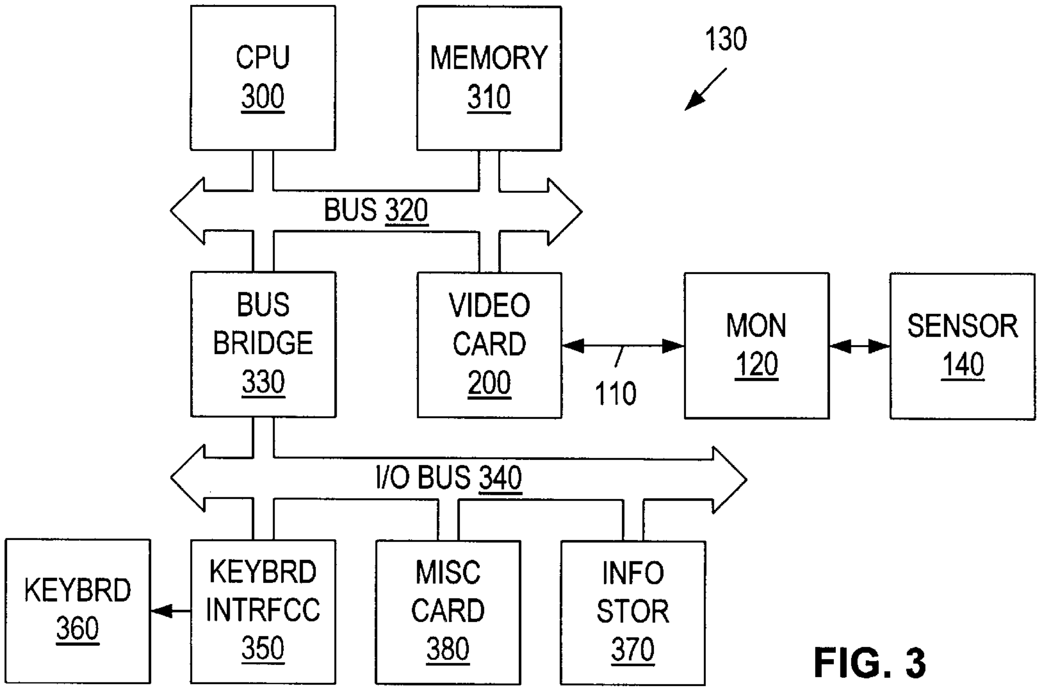
FIG. 3 is a block diagram of the server computer in FIG. 2 according to one embodiment of the present invention.

Computer 130 is further detailed in FIG. 3 with a diagram of one embodiment of the preferred system components. A CPU 300 is operably coupled to a memory 310 through a bus 320, along with enhanced video card 200. A bus bridge 300 operably couples bus 320 to I/O bus 340 which has shown connected to it a keyboard interface 350, an information storage device 370, such as an IDE hard drive or SCSI CD-ROM through an appropriate controller, and an expansion or miscellaneous card 380 with other or miscellaneous purpose, such as a network card or additional SCSI controller, for example. A standard keyboard 360 is attached off of the keyboard interface 350. Devices such as the enhanced video card 200 or the information storage device 370 may also be operably coupled into computer 130 through the other bus 320 or 340 as desired. In an embodiment where sensor 140 is a keyboard, the keyboard interface 350 and the standard keyboard would not be needed. Other standard parts or components may be added to the computer 130 as desired through additional or substitute connections to bus 320 and/or I/O bus 340.

Enhanced video card 200 is directly connected to the monitor 120 via high speed serial connection 110. Sensor 140 directly couples to monitor 120. Note that the connections between the enhanced video card 200 and the monitor 120, and the monitor 120 and the sensor are bi-directional with data being transferred both ways between the respective devices. High speed serial connection 110 also preferably includes a return high speed serial line for return and/or feedback data transmission.

Bus 320 and I/O bus 340 are preferably parallel buses, defined as a plurality of data and address lines which convey data from one device attached to that bus to another device attached to that bus. Of course, using bus bridge 330, devices on the bus 320 may communicate with devices on the I/O bus 340 and vice versa. Native format video, audio and control data in parallel format are transmitted from various components of computer 130 to the enhanced video card 200. The data are there serialized for transmission on the serial connection 110 for transfer to the monitor 120. At monitor 120, the data are deserialized and converted back into native format for display, audio output or operation as appropriate to the type of data, i.e., video, audio or control. The reverse parallel-to-serial-to-parallel operations are carried out with respect to the feedback or sensor control data being transmitted from the monitor 120 to the enhanced video card 200 for inclusion into the operations of the computer 130. For the purposes of this document, video data and audio data shall include still, motion, or graphics data, audio data in the audible range or any related data as is well known in the art. Control data may provide operational control of the video and/or audio data by the monitor 120 display and/or speakers (not shown) and/or the computer 130 CPU 300 and/or other processing device or unit (not shown). Illustrative examples of the resultant operations from such control data include changing contrast, brightness, volume, power levels, etc.

Figure 4:
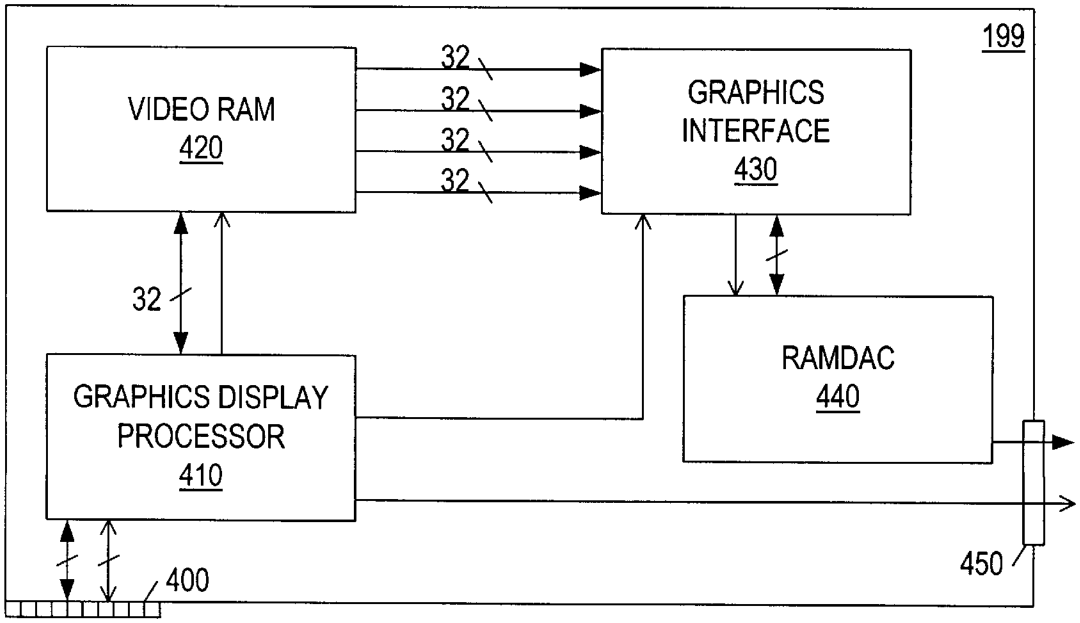
FIG. 4 (PRIOR ART)
FIG. 4 is a block diagram of a prior art video card.

For comparison purposes, a prior art video card is illustrated in FIG. 4. Shown as an add-in card for I/O bus 340 with connectors 400, control data (shown with open arrowheads) and data (shown with solid arrowheads) are input from the I/O bus 340 into a graphics display processor 410 which manipulates the incoming video data for output to the display of the monitor 120 through a parallel output port 450 on parallel data lines (not shown).

Typically, 32 bit data and various control data are output from the graphics display processor 410 into video RAM 420 such as EDO RAM, VRAM or SGRAM, usually dual ported memory, in amounts of 1 MB, 2 MB, 4 MB or even 8 MB. As illustrated, 4 MB of video RAM 420 are assumed in four banks of memory as is well known in the art. Each bank outputs 32 bits of video data to a graphics interface 430 which also accepts control data from the graphics display processor 410 and outputs the video data to a RAMDAC 440 for conversion from digital data into the analog data required by most standard computer monitors. Video data may also be returned to the graphics interface 430 from the RAMDAC 440. The RAMDAC 440 outputs video data to the display of the standard analog monitor through a parallel output port 450. Command information for the video data from the graphics display processor 410 may also be included in the output parallel data stream to the standard monitor.

Figure 5:
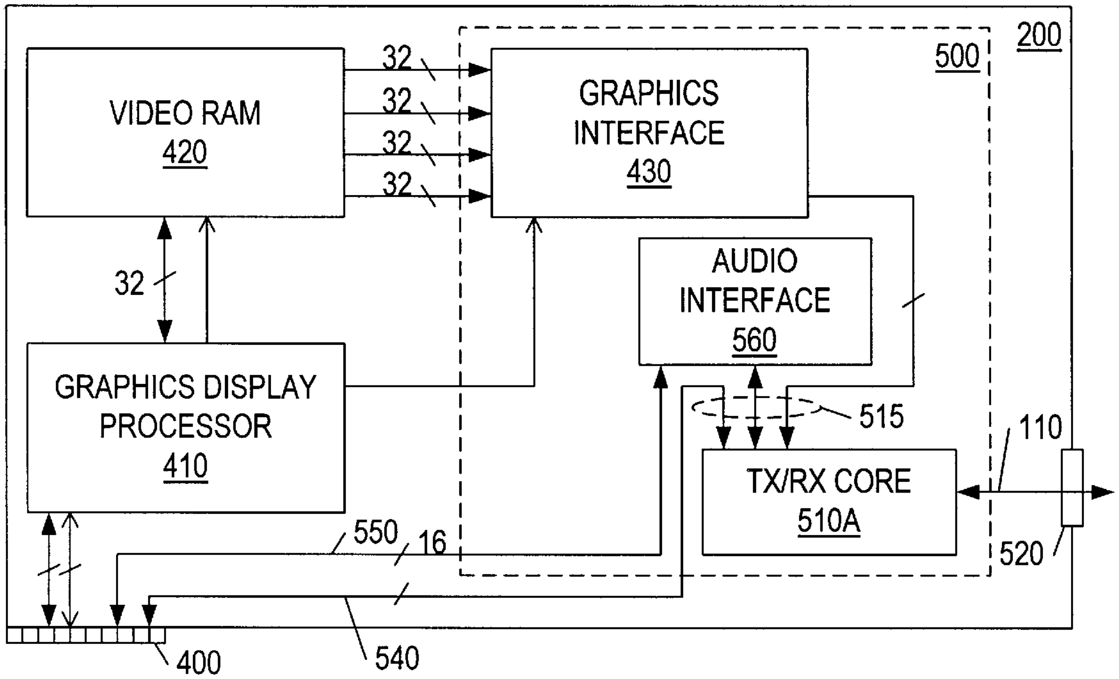
FIG. 5 is a block diagram of one embodiment of an enhanced video card, according to the present invention, which includes an audio interface.

In contrast, FIG. 5 illustrates an enhanced video card 200 according to the present invention which acts as an audio/video interface 200 for computer 130. Shown as an add-in card for bus 320 with connectors 400, control data (shown with open arrowheads) and data (shown with solid arrowheads) are input from the bus 320 into a graphics display processor 410 coupled to accept commands from the CPU and data from the main memory and which manipulates the incoming video data for output to the display of the monitor 120 through a base serial output port 520 on a high speed serial connection 110 coupled between the base serial output port 520 and a remote serial input port, which will be seen below with respect to FIG. 6. Data are also transferred via parallel data lines 540 directly into a base transceiver 510A, also called a TX/RX (transmit/receive) core 510A. Additionally, 16 bit audio data may be transferred directly to the audio interface 560 by way of parallel data lines 550.

Transceiver 510 preferably includes an encoder/decoder pair for encoding of the data prior to transmission and decoding of the data subsequent to transmission. Encoding is performed to provide desirable characteristics incorporated into the data stream. Some desirable characteristics include: transitions so that clocks can be recovered, parity for error checking, DC balance, and extra characters that can be used for controls, such as, start, end, and error. The only necessary encoding requirement is at least one transition every ten bits. The encoding is preferably 8B/10B encoding although other encoding schemes are contemplated. The 8B/10B encoding is described in U.S. Pat. No. 4,486,739, titled *Byte Oriented DC Balanced* (0,4) *8B/10B Partitioned Block Transmission Code*, whose inventors were Peter A. Franaszek and Albert X. Widmer, and which was assigned to International Business Machines Corporation, which is hereby incorporated by reference in its entirety. Encoding preferably occurs just prior to the data being input to the transceiver 510, preferably at port 515.

Typically, 32 bit data and various control data are output from the graphics display processor 410 into video RAM 420 such as EDO RAM, VRAM or SGRAM, usually dual ported memory, in amounts of 1 MB, 2 MB, 4 MB or even 8 MB. The video RAM 420 is coupled to accept and store processed graphics and video data output by the graphics display processor. As illustrated, 4 MB of video RAM 420 are assumed in four banks of memory as is well known in the art. Each bank outputs 32 bits of video data to a graphics interface 430 which also accepts control data from the graphics display processor 410 and outputs the video data in digital form to the base transceiver 510A for combining the video, audio and control data for serial, encoded transfer to the monitor 120. A base parallel input port for receiving parallel data from other components (not shown) conducts parallel input data into an improved graphics interface unit 500 and particularly TX/RX core 510A. The improved graphics interface unit 500, including the graphics interface 430, the audio interface 560 and the base transceiver 510A, is preferably a single monolithic integrated circuit. This single monolithic integrated circuit is preferably CMOS but may also be composed of other semiconductor materials as desired.

Figure 6:
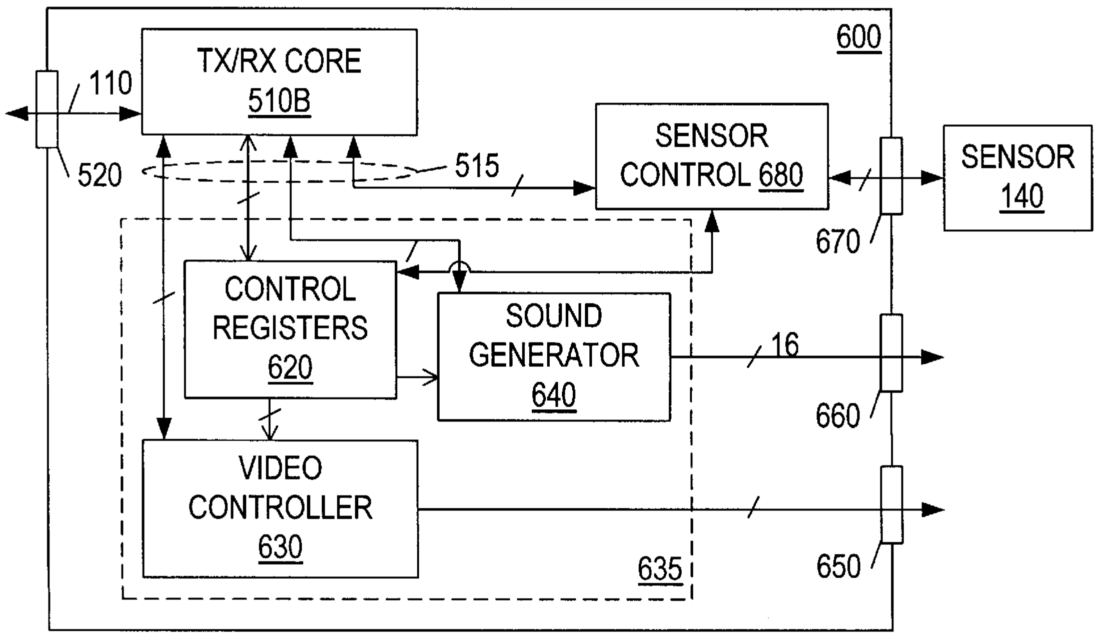
FIG. 6 is a block diagram of one embodiment of an enhanced receive chip for a computer monitor, according to the present invention, which includes a sound generator and a feedback sensor connection.

In FIG. 6, a receive chip 600, also called a communications module 600 or simply a transceiver 600, is illustrated in a preferred embodiment. The high speed serial connection 110 couples to the communications module 600 through a first input port 520 for receiving serialized data. A remote transceiver 510B, also called TX/RX core 510B, receives the serialized, encoded data and outputs through a first output port 515 for transmitting deserialized data to an audio and video control unit 635. A second input port 670 is adapted for receiving feedback data forwarded from a sensor 140 to the remote transceiver 510B. The serialized data may comprise video, audio and control data as described with respect to FIG. 3.

The audio and video control unit 635 preferably comprises control registers 620, a video controller 630 and a sound generator 640. Control data are sent from the TX/RX core 510B to the control registers 620 after being decoded and may be output to the video controller 630 and/or the sound generator 640. Control/feedback data may also be forwarded from the sensor control 680. The video controller 630 transfers video data through output port 650 to the display unit (not shown) of the monitor. In the preferred embodiment, the display unit is digital, such as one using TFTs (Thin Film Transistors) to actuate each pixel, and can accept the video data in digital format. Should a standard analog display unit be desired, a RAMDAC may be incorporated into the video controller 630. The sound generator 640 outputs stereo or mono sound through output port 660 to the speakers (not shown). Although shown as both separate and combined ports in some cases, input and output ports (such as 450, 520, 650, 660, 670, etc.) may be combined or separated as necessary for convenience or for cost considerations in manufacturing.

The remote transceiver 510B further comprises a receiver, see FIG. 7 below, operably coupled between the first input port 520 and the first output port 515. A transmitter described in detail in FIG. 7 included in the remote transceiver 510B preferably includes a third input port (shown combined with first output port 515 for simplicity) for receiving parallel data and a second output port (shown combined with first input port 520 for simplicity) for transmitting a serial, encoded data stream. The serial, encoded data stream is sent on a return high speed serial connection shown as part of high speed serial connection 110. Preferably parallel data is received by the third input port 515 concurrent with the serialized, encoded data being received at the first input port 520. As sensors 140 are well known in the art, suffice it to say that feedback data from the sensor 140 may be dispatched from the sensor in response to palpable input, physical contact thereon, optical input, sonic input, or other energy/information input as desired.

Figure 7:
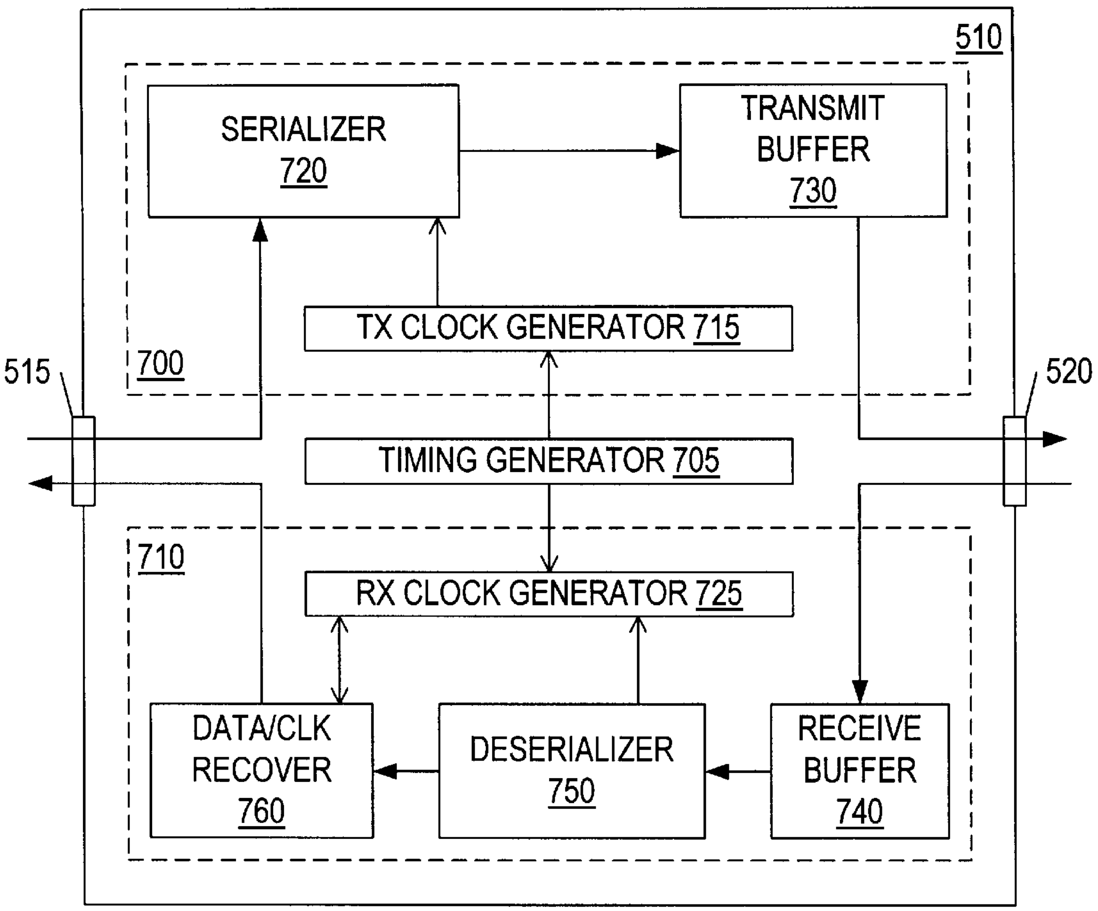
FIG. 7 is block diagram of one embodiment of a serial transceiver core according to the present invention.

A diagram of a preferred embodiment of the internal workings of the T/RX core 510 is shown in FIG. 7. Included as part of the enhanced graphics interface unit 500 (shown in FIG. 5) and as a part of communications module 600 (shown in FIG. 6) are the base transceiver 510A and the remote transceiver 510B, respectively. For simplicity in the figures, the ports are often combined with a single port being illustrated to represent one or more physical ports. For example, a serial input port and a serial output port are combined as port 520. The first input port 520 and the second output port 520, respectively, input and output native format data in parallel form. Input data are sent to the transmitter 700 to the serializer 720 for conversion into serial data for transmission on the high speed serial connection 110. A timing generator 705 provides a reference clock signal to the transmitter 700 to a TX clock generator 715 for clocking the serial data at the transmission speed of the high speed serial connection 110 rather than the clock signal generated by the timing generator 705. Serialized data which were encoded prior to entering the TX/RX core 510 are then conveyed to a transmit buffer 730 before being output through second output port 520 onto of the high speed serial connection 110. Native format describes the format in which the data are originally created, or thereafter manipulated, in any part of the computer system.

The serialized, encoded data stream incoming to TX/RX core 510 is received at first input port 520 and input to receiver 710 to a receive buffer 740. The serialized, encoded data are transferred to a deserializer 750 which deserializes the data and transfers the deserialized, encoded data to data/clk recovery logic 760. The deserializer 750 also outputs clocking information to a RX clock generator 725. A reference clock signal from timing generator 705, along with clocking information from the deserializer 750 and the data/clk recovery logic 760 allows the RX clock generator 725 to recreate the true timing signal (receive clock signal) from the data. Thus the high speed serial connection is not required to transmit a separate clock signal. The data clock is recovered from the data themselves. The data in its native format is output in parallel to a decoder, along with the recovered clock signal at the first output port 515. The TX/RX core 510 is preferably part of a monolithic integrated circuit that is also preferably a CMOS integrated circuit although other semiconductor materials may also be used.

It will be appreciated to those skilled in the art having the benefit of this disclosure that this invention is believed to be a computer system capable of serially transmitting and receiving video, audio and control data to and from one or more monitors while simultaneously serially transmitting control data from one or more sensors operably coupled to the monitor(s). It is intended that the following claims be interpreted to embrace all such modifications and changes and, accordingly, the specification and drawings are to be regarded in an illustrative rather than a restrictive

What is claimed is:

1. A computer system, comprising:

a base transceiver having a base transmitter including:

a base parallel input port for receiving parallel data;

a base serial output port for transmitting solely a serial data stream consisting of digital data; and a base serial input port for receiving a return serial data stream;

a remote transceiver having a remote receiver including:

a remote serial input port for receiving the serial data stream;

a remote audio/video output port for transmitting deserialized data to an audio and video control unit; and a remote serial output port for transmitting a return serial data stream; and a return high speed serial connection between said remote serial output port of said remote transceiver and said base serial input port of said base transceiver, wherein said return serial data stream is received by said base serial input port concurrent with said serial data stream being received by said remote serial input port; and a high speed serial connection between said base serial output port of said base transceiver and said remote serial input port of said remote transceiver.

2. The computer system as recited in claim 1, wherein said remote transceiver further includes a feedback input port adapted for receiving feedback data forwarded from a sensor to the audio and video control unit.

3. The computer system as recited in claim 2, wherein said sensor dispatches said feedback data in response to palpable input.

4. The computer system as recited in claim 2, wherein said sensor dispatches said feedback data in response to optical input.

5. The computer system as recited in claim 2, wherein said sensor dispatches said feedback data in response to sonic input.

6. The computer system as recited in claim 2, wherein said sensor dispatches said feedback data in response to physical contact thereon.

7. The computer system as recited in claim 2, wherein said remote transceiver further comprises:

said remote serial output port for transmitting solely said return serial data stream consisting of digital data;

a remote transmitter operably coupled between said feedback input port and said remote serial output port; and a timing generator coupled to recover a clock signal from said serial data stream and to synchronize said deserialized data using the clock signal.

8. The computer system as recited in claim 7, wherein said base transceiver further comprises:

a base receiver operably coupled to said base serial input port.

9. The computer system as recited in claim 1, wherein said serial data stream is selected from the group comprising video, audio and control data.

10. The computer system as recited in claim 1, wherein said base transceiver further comprises a serializer coupled to convert said parallel data into said serial data stream.

11. The computer system as recited in claim 10, wherein said remote transceiver further comprises a deserializer coupled to convert said serial data stream into said deserialized data.

12. A computer system, comprising:

a computer for processing data, including:

a central processing unit (CPU), main memory operably coupled to the CPU, wherein the main memory stores data accessible by the CPU; and an audio/video interface operably coupled to the CPU and the main memory, wherein the audio/video interface is configurable to provide audio and video output to a computer monitor, said audio/video interface including:

a graphics display processor coupled to accept commands from the CPU and to accept data from the main memory, wherein the graphics display processor is operable to process graphics and video data;

video RAM coupled to accept and store processed graphics and video data output by the graphics display processor;

an improved graphics interface unit coupled to accept processed graphics and video data stored by the video RAM, wherein the improved graphics interface unit is further coupled to accept input from the graphics display processor, wherein said improved graphics interface unit includes:

a base timing generator for generating a base clock signal for synchronized timing in the improved graphics interface unit;

a base transceiver for transmitting and receiving serialized data selected from the group comprising video, audio and control data, wherein said base transceiver includes:

a base receiver having a receive buffer for receiving said data, wherein said receiver further includes:

a base deserializer for converting said serialized data into an input data format recognizable by the computer;

a base recovery and alignment logic coupled to said base deserializer for recovering said input data and synchronizing the input data;

a base receive clock generator which uses said base clock signal to recover a base data clock from said serialized data;

a base transmitter for receiving an output data format recognizable by the computer monitor, wherein said base transmitter includes a base transmit buffer for transmitting said output data, and wherein said base transmitter further includes:

a base serializer coupled to said base transmit buffer for converting said output data into a serial data stream;

a base transmit clock generator which uses said base clock signal to synchronize transmission by the base transmit buffer and conversion by the base serializer of said serial data stream; and the computer monitor, comprising:

a remote communications module adapted for use in the computer monitor, said remote communications module including:

a remote timing generator for generating a remote clock signal for synchronized timing in the remote communications module;

a remote transceiver for transmitting and receiving serialized data selected from the group comprising video, audio and control data, wherein said remote transceiver includes:

a remote receiver having a remote receive buffer for receiving said data, wherein said remote receiver includes:

a remote deserializer for converting said serialized data into an input data format recognizable by the computer monitor;

a remote recovery and alignment logic coupled to said remote deserializer for recovering said input data and synchronizing the input data; and a remote receive clock generator which uses said remote clock signal to recover a remote data clock from said serialized data; and a remote transmitter for receiving an output data format recognizable by the computer, wherein said remote transmitter includes a remote transmit buffer for transmitting said output data, and wherein said remote transmitter further includes:

a remote serializer coupled to said remote transmit buffer for converting said output data into a serial data stream; and a remote transmit clock generator which uses said remote clock signal to synchronize transmission by the remote transmit buffer and conversion by the remote serializer of said serial data stream;

an audio and video control unit coupled to receive said input data and dispatch said output data;

a display unit for displaying the video input or output data;

a high speed serial connection operably coupled between said base transmitter and said remote receiver; and a return high speed serial connection operably coupled between said remote transmitter and said base receiver wherein a return serial data stream is received by said base receiver concurrent with said serial data stream being received by said remote receiver.

13. The computer system of claim 12, wherein said communications module is a monolithic integrated circuit; and wherein said improved graphics interface unit is a second monolithic integrated circuit.

14. The computer system of claim 13, wherein said monolithic integrated circuit is a CMOS integrated circuit; and wherein said second monolithic integrated circuit is a second CMOS integrated circuit.

15. The computer system of claim 12, further comprising:

one or more additional computer monitors, each including:

an instance of said remote communications module;

one or more additional high speed serial connections between the computer and the instance of said remote communications module of one of the one or more additional computer monitors; and one or more additional return high speed serial connections between the computer and the instance of said remote communications module of one of the one or more additional computer monitors;

wherein the computer further comprises:

at least an additional one or more additional improved graphics interface units for each of the one or more additional computer monitors in the computer system.

16. A computer system, comprising:

an audio/video interface is configurable to provide audio and video output to a computer monitor, said audio/video interface comprising:

a graphics display processor coupled to receive commands and data, wherein the graphics display processor is configured to process and output graphics and video data;

video RAM coupled to receive and store processed graphics and video data output by the graphics display processor;

an improved graphics interface unit coupled to receive processed graphics and video data stored by the video RAM, wherein the improved graphics interface unit is further coupled to accept input from the graphics display processor, wherein said improved graphics interface unit includes:

a base timing generator for generating a base clock signal for synchronized timing in the improved graphics interface unit;

a base transceiver for transmitting and receiving serialized data selected from the group comprising video, audio and control data, wherein said base transceiver includes:

a base receiver having a receive buffer for receiving said data, wherein said base receiver further includes:

a base deserializer for converting said serialized data into an input data format recognizable by the computer system;

a base recovery and alignment logic coupled to said base deserializer for recovering said input data and synchronizing the input data;

a base receive clock generator which uses said base clock signal to recover a base data clock from said serialized data; and a base transmitter for receiving an output data format recognizable by the computer monitor, wherein said base transmitter includes a base transmit buffer for transmitting said output data, and wherein said base transmitter further includes:

a base serializer coupled to said base transmit buffer for converting said output data into a serial data stream; and a base transmit clock generator which uses said base clock signal to synchronize transmission by the base transmit buffer and conversion by the base serializer of said serial data stream; and the computer monitor, comprising:

a remote transceiver for transmitting and receiving serialized data selected from the group comprising video, audio and control data, wherein said remote transceiver includes:

a remote receiver having a remote receive buffer for receiving data;

a remote transmitter for receiving an output recognizable by the computer, wherein said remote transmitter includes a remote transmit buffer for transmitting said output data, wherein said remote transmitter further includes:

a remote serializer coupled to said remote transmit buffer for converting said output data into a serial data stream; and a high speed serial connection coupled between said base transmitter and said remote receiver; and a return high speed serial connection coupled between said remote transmitter and said base receiver, wherein a return serial data stream is received by said base receiver concurrent with said serial data stream being received by said remote receiver.

17. The computer system of claim 16, further comprising:

a central processing unit (CPU);

main memory operably coupled to the CPU, wherein the main memory stores data accessible by the CPU; and an instance of the audio/video interface operably coupled to the CPU and the main memory, wherein the audio/video interface is configured to provide audio and video output to the computer monitor.

18. The computer system of claim 16, wherein the audio/video interface is configured as an add-in card.

* * * * *